United States Patent [19]

Kitamura

[11] 4,301,480
[45] Nov. 17, 1981

[54] APPARATUS FOR MONITORING REPRODUCED AUDIO SIGNALS DURING FAST PLAYBACK OPERATION

[75] Inventor: Masatsugu Kitamura, Yokohama, Japan

[73] Assignee: Victor Company of Japan, Limited, Yokohama, Japan

[21] Appl. No.: 139,509

[22] Filed: Apr. 11, 1980

[30] Foreign Application Priority Data

Apr. 18, 1979 [JP] Japan ................................. 54-47444

[51] Int. Cl.$^3$ .......................... G11B 5/00; G11B 15/18
[52] U.S. Cl. ......................................... 360/8; 360/72.1
[58] Field of Search ................... 360/8, 32, 72.1, 72.2

[56] References Cited

U.S. PATENT DOCUMENTS 3,860,760  1/1975  Rittenbach ............................. 360/8
4,157,571  6/1979  Shu ........................................ 360/8
4,206,476  6/1980  Hashimoto ............................ 360/8

Primary Examiner—Vincent P. Canney
Attorney, Agent, or Firm—Pollock, VandeSande & Priddy

[57] ABSTRACT

Apparatus for monitoring reproduced audio signals during fast playback operation comprises a bucket-brigade device for storing pieces of audio information reproduced from a recording medium at a high speed. The stored pieces of information are read out in a sequence at a slower speed than they were stored when the magnitude of the reproduced audio signal exceeds a predetermined value so that the audio information will be restored to the original pitch to be monitored. The interval for which an audio signal is stored in the bucket-brigade device may be controlled in accordance with the speed of the recording medium.

15 Claims, 5 Drawing Figures

APPARATUS FOR MONITORING REPRODUCED AUDIO SIGNALS DURING FAST PLAYBACK OPERATION

FIELD OF THE INVENTION

This invention generally relates to apparatus for monitoring reproduced audio signals during fast playback operation. More particularly, the present invention relates to apparatus for monitoring reproduced audio signals by expanding the time axis of the audio signals reproduced at a speed higher than a normal playback speed, so that the reproduced audio sounds are monitored at normal pitch.

BACKGROUND OF THE INVENTION

When an user or an operator of a recording device, such as a magnetic tape recorder, intends to monitor the information prerecorded on a recording medium, such as a magnetic tape, it is necessary to reproduce the audio signals at a normal playback speed. However, it takes a long period of time to search a given piece of information if a magnetic tape is played back from beginning to end at the normal playback speed. Therefore, according to a conventional technique the magnetic tape is reeled at a speed much higher than the normal playback speed, while the information prerecorded on the magnetic tape is reproduced via a reproduce head. Since the fast forward reeling speed is usually between 10 and 100 times the normal playback speed, it is almost impossible to ascertain the reproduced audio signals in detail, while it may be possible to detect whether the reproduced audio signal is a vocal sound or a piece of music; or whether the reproduce head is scanning a recorded portion or a blank portion (a portion on a magnetic tape on which no signal has been prerecorded). Accordingly, in order to obtain the information prerecorded on a magnetic tape within a relatively short period of time, the operator of a tape player has to repeat manipulation of switches of the tape player so that the tape is reeled at a fast forward speed and a normal playback speed cyclically. Searching a piece of prerecorded information in this method is troublesome and inconvenient.

In order to remove the above mentioned inconvenience apparatus for monitoring prerecorded information during fast reeling of a magnetic tape was devised in the past. This conventional apparatus employs a charge-transfer-device (CTD), and thus expands the time axis of the prerecorded information reproduced at a speed higher than the recording speed by changing the frequency of drive pulses applied to the charge-transfer-device so that the time axis corresponds to the original recording speed. Namely, if the information prerecorded on a magnetic tape is a vocal sound, the above mentioned apparatus samples each phoneme which constitute a vocal sound for very short period of time. As a result, when listening to the reproduced sound, the time axis of which has been expanded, it is extremely difficult to understand the contents of the reproduced audio sounds if the audio signals are reproduced from the magnetic tape at a speed much higher than the normal playback speed. In detail, the above mentioned apparatus effectively operates only when he magnetic tape is reeled at a speed less than twice or three times the normal playback speed. Therefore, when the magnetic tape is reeled at a speed between 10 and 100 times the normal playback speed, it is impossible to understand the contents of the vocal sounds. Furthermore, if the recorded information is a piece of music, the music will be reproduced in a distorted form, while the musical notes might be deviated from the original notes. This conventional apparatus was disclosed in a magazine, POPULAR SCIENCE, issued on January 1975 in the name of VSC (variable speech control) tape recorder. A similar technique was also disclosed in a U.S. Pat. No. 3,786,195 to Shiffman.

Accoding to the technique of VSC a tape is reeled at a speed twice faster than the recording speed so that the information prerecorded on the magnetic tape is originally reproduced at this fast speed. The information reproduced is repeatedly sampled, and each sampling period is about 20 milliseconds than which most phonemes (the sounds by which we recognize speech) are longer. The sampled pieces of information are successively stored in a bucket-brigade shift register, which is a kind of the above mentioned charge-transfer-device, and then read out in a sequence at a lower speed than they were stored so that the reproduced speech is stretched out to a length which equals twice the compressed period.

This conventional apparatus is useful when it is intended to effect fast listening along the entire tape. However, as mentioned hereinabove, when the magnetic tape is reeled at a speed over approximately three times the recording speed, the conventional apparatus sacrifices clarity or intelligibility. Consequently, the conventional apparatus is not suitable for searching a given piece of information prerecorded on a magnetic tape. Furthermore, it is impossible to add the above mentioned VSC system to a regular tape recorder since VSC requires a variable-speed-playback motor and motor control synchronized with the variable-delay line. In other words, according to the VSC technique a special circuit has to be built in a tape recorder.

SUMMARY OF THE INVENTION

The present invention has been achieved in order to remove the inconvenience and disadvantages inherent to conventional technique and apparatus for fast monitoring.

It is, therefore, a primary object of the present invention to provide apparatus for monitoring reproduced audio signals during fast playback operation, in which information prerecorded on a recording medium may be monitored at a substantially normal playback pitch although the recording medium, such as a magnetic tape, is reeled at a speed over ten times faster than the recording speed.

Another object of the present invention is to provide apparatus for monitoring reproduced audio signals during fast playback operation, in which the reproduced audio signal is sampled for a relatively long period of time so that the intelligibility is quite high.

A further object of the present invention is to provide apparatus for monitoring reproduced audio signals during fast playback operation, in which not only speeches but also pieces of music can be monitored at the originally recorded speed.

A still further object of the present invention is to provide apparatus for monitoring reproduced audio signals during fast playback operation, in which blank portions having no significant information are not monitored.

A yet further object of the present invention is to provide apparatus for monitoring reproduced audio signals during fast playback operation, which apparatus may be added to customary tape recorders or the like.

According to the present invention a level detecting circuit is employed for producing an output signal when the magnitude of the reproduced signals exceeds a predetermined value. A bucket-brigade device (BBD) stores pieces of information reproduced at a speed much higher than it was recorded in accordance with a pulse train singal the frequency of which is varible depending on the tape speed. Upon presence of the output signal of the level detecting circuit, a second pulse train signal, the frequency of which is much lower than that of the above mentioned first pulse train signal, is applied to the BBD so that the information stored in the BBD is read out in a sequence at a normal playback speed which equals the recording speed.

BRIEF DESCRIPTION OF THE DRAWINGS

These and other objects and features of the present invention will become more readily apparent from the following detailed description of the preferred embodiment taken in conjunction with the accompanying drawings in which.

DETAILED DESCRIPTION OF THE PREFERRED EMBODIMENT

As mentioned hereinabove, if the information reproduced were cyclically sampled at a given interval in the same manner as in the aforementioned conventional apparatus, not only desired information but also blank portions on which no significant signals were recorded would be sampled and therefore monitored providing the listener with no audio signals. Such monitoring operation is useless, while it consumes time. Especially, when the information to be monitored is a speech, this becomes a big problem for speeches usually contain a lot of blank or no sound portions.

In order to overcome the above mentioned disadvantage the inventor of the present invention utilized a level detecting circuit for detecting whether reproduced information has a magnitude greater than a predetermined value or not. Namely, the inventor has noticed that most voice sounds have a length between 0.5 and 3 seconds, while the reproduced signal level at the center of voice sounds is relatively greater than remaining portions. For this reason, according to the present invention the expansion of reproduced information is performed only when the level or magnitude of the reproduced audio signal exceeds a predetermined value. Since reproduced audio signals are repeatedly stored in a memory means, it is possible to monitor the reproduced auido signals not only after the level thereof has been detected to be greater than a predetermined value, but also a little bit prior to the instant of such detection.

Figure 1:
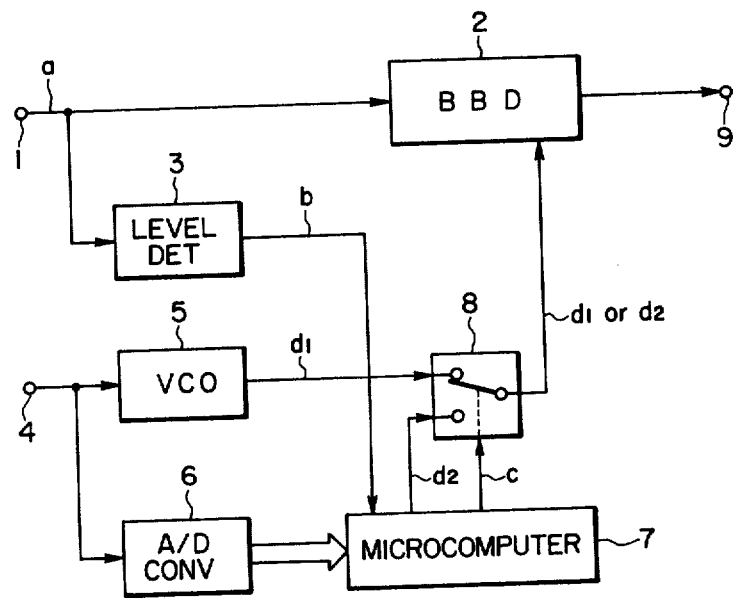
FIG. 1 is a schematic block diagram of an embodiment of the apparatus for monitoring reproduced audio signals during fast playback operation according to the present invention.

Reference is now made to FIG. 1 which shows a schematic block diagram of an embodiment of the apparatus according to the present invention. The apparatus will be added, when used, to any kind of reproducing apparatus, such as tape or disk recorders or players, video tape recorders and even motion picture projectors. It is assumed that the apparatus of FIG. 1 works on a magnetic recording tape for the purpose of description. Namely, the apparatus is added to a tape player which is not shown. The tape player, such as a cassette tape recorder or an open-reel tape recorder, comprises a reproduce head and a drive motor to which drive power is applied. The drive motor is operatively connected to a take-up reel so that the magnetic recording tape is reeled at a high speed such as between 10 and 100 times the normal playback speed, as the drive motor is fed with a corresponding voltage. The tape player further comprises an audio-frequency amplifier which is responsive to the output signal of the reproduce head.

Turning back to FIG. 1, the apparatus according to the present invention comprises a bucket-brigade device BBD 2, a level detecting circuit 3, a voltage-controlled oscillator 5, an analog to digital (A/D) converter 6, a microcomputer 7 and a switching circuit 8. The apparatus further comprises first and second input terminals 1 and 5, and an output terminal 9.

The first input terminal 1 is responsive to reproduced audio signals from the magnetic reproduce head (not shown), and an audio signal fed to the first input terminal 1 is designated as a. The first input terminal 1 is connected to an input terminal of the BBD 2 and to an input terminal of the level detecting circuit 3. An output terminal of the BBD 2 is connected to the output terminal 9, while an output terminal of the level detecting circuit 3 is connected to an input terminal of the microcomputer 7. The output signal developed at the output terminal of the level detecting circuit 3 is designated as b.

The second input terminal 4 is responsive to a signal indicative of the tape running speed. In the embodiment, the second input terminal 4 is responsive to the voltage applied to the drive motor (not shown) of the tape player. Since the voltage applied to the drive motor which drives the take-up reel represents the rotational speed of the take-up reel, the voltage substantially indicates the tape running speed. The second input terminal 4 is connected to an input terminal of the voltage-controlled oscillator 5 and to an input terminal of the A/D converter 6. The voltage-controlled oscillator 5 produces a pulse train signal d1 the frequency of which varies in accordance with the voltage at the input terminal thereof. Namely, the frequency of the pulses d1 increases as the tape speed rises and vice versa.

The A/D converter 6 produces a digital signal indicative of the tape speed, and then this digital signal is fed to the microcomputer 7. Since the digital signal consists of a plurality of bits, the connection between the A/D converter 6 and the microcomputer 7 is shown by a wide arrowed line. The microcomputer 7 has first and second output terminals respectively connected to the switching circuit 8 which is shown to have a movable contact and first and second stationary contacts. The movable contact is controlled by an output signal c of the microcomputer 7 to be contact with either the first or second stationary contact the switching circuit 8 to which the above mentioned first and second pulse train signals d1 and d2 are respectively applied. The movable contact of the switching circuit 8 is connected to the BBD 2 so that one of the first and second pulse train signals d1 and d2 is selectively fed to the BBD 2 to control the shifting operation thereof.

Although in the above it has been described that the tape running speed is measured by detecting the voltage applied to the drive motor, any other signal indicative of the tape running speed may be used instead. Furthermore, the switching circuit 8, which is shown to be a mechanical switch, such as a relay, may be substituted with an electronic switch, such as a gate circuit.

Figure 2:
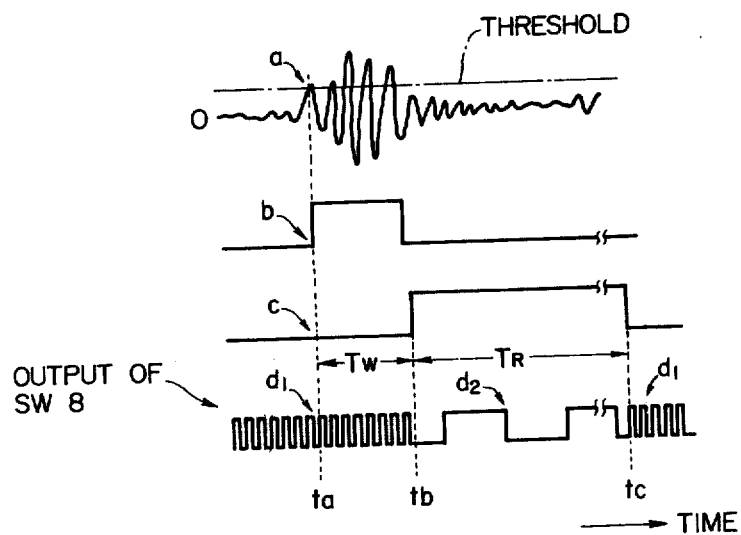
FIG. 2 is a waveform chart useful for understanding the operation of the apparatus shown in FIG. 1.

FIG. 2 is a waveform chart illustrating various waveforms of the above mentioned signals in the apparatus of FIG. 1. The operation of the apparatus of FIG. 1 will be described in detail hereinafter. The audio signals which have reproduced by the reproduce head at a fast speed are progressively applied to the BBD 2. In other words, one bit of information is fed to one end. When the second bit comes along, it shoves the first bit into slot number two. When the third bit arrived, the first two slide down to make room for it. When the entire bucket brigade 2 is loaded to capacity, the first pieces that entered start falling off the far end. The pulses d1 or d2 from the switching circuit 8 determine when the bucket-brigade 2 shifts the bits of information from one "bucket" to another. With this operation a series of pieces of information are progressively stored in the BBD 2 and then read out from the output terminal thereof in a sequence.

The level detecting circuit 3 may be constructed of an envelope detector and a comparator responsive to the output signal of the envelope detector. It is assumed that the level of the reproduced audio signal exceeds a threshold of the level detecting circuit at time ta as shown in FIG. 2. The level detecting circuit 3, therefore, produces a high level output signal b as long as the envelope of the peak value of the reproduced audio signal a is above the threshold. This high level output signal b will be fed to the microcomputer 7 to control the operation of the same as will be described hereinlater.

Figure 3:
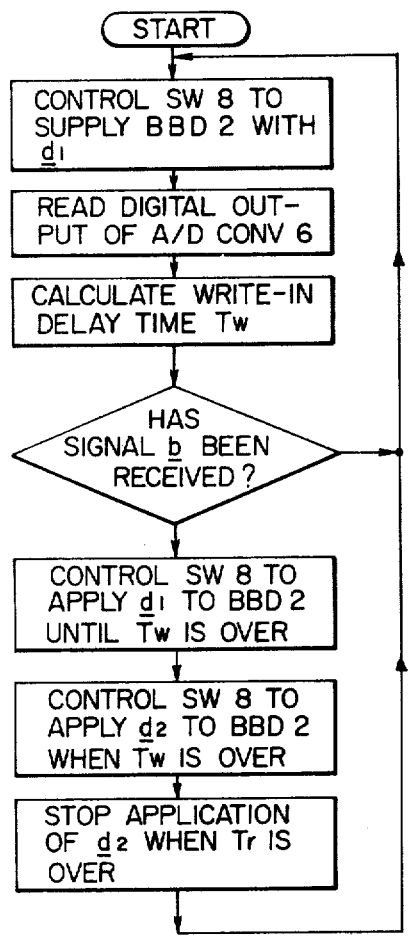
FIG. 3 is an example of a flow chart indicating the operation of the microcomputer shown in FIG. 1.

On the other hand, the microcomputer 7 which controls the switching circuit 8 operates as follows in accordance with the operational sequence represented by the flow chart of FIG. 3. The microcomputer 7 starts upon application of power. At the beginning the microcomputer 7 produces a control signal c with which the switching circuit 8 is so controlled that the first pulses d1 having a high frequency, such as 100 KHz, from the voltage-controlled oscillator 5 are applied to the BBD 2. In the next step, the microcomputer reads the digital data from the A/D converter 6 to see how fast the magnetic recording tape is running. Then the microcomputer 7 calculates a write-in delay time Tw from a reciprocal of the digital data indicative of the tape speed. Namely, the write-in delay time Tw is in proportion to the reciprocal of the tape speed. This delay time Tw will be determined in such a manner that the BBD 2 is loaded to capacity irrespectively of the tape speed. In the next step, the microcomputer 7 detects whether the level detecting circuit 3 is producing the high level output signal b or not. If the answer of this step is NO, i.e. the level detecting circuit 3 has not yet produced a high level output signal b, the operational sequence returns to the beginning. On the contrary, if the answer of this step is YES, time control with respect to the above mentioned write-in delay time Tw is initiated. Namely, the first pulses d1 from the voltage-controlled oscillator 3 are continuously fed through the switching circuit 8 to the BBD 2 for this interval Tw. This interval Tw is defined by ta and tb as shown in FIG. 2, so that at time tb, i.e. when the write-in delay time Tw is over, the switching circuit 8 is controlled to supply the BBD 2 with the second pulses d2 having a frequency much lower than that of the first pulses d1. The second pulses d2 may be derived from a suitable clock pulse generator built in the microcomputer 7, and the frequency of the second pulses d2 is 10 KHz in this embodiment. The frequency of the second pulses d2 is selected so that the information stored in the BBD 2 is progressively read out at a normal playback speed which corresponds to the recording speed. The second pulses d2 are applied to the BBD 2 for a read-out interval Tr which is required to read out all of the information prestored in the BBD 2. In other words, the microcomputer 7 controls a read-out interval Tr by controlling the switching circuit 8. Suppose that the BBD 2 has stored 16,384 pieces of analog samples, and that these samples are read out by the above mentioned 10 KHz clock pulses d2, the read-out interval Tr, which equals the length of the read out audio signal, is approximately 1.6 second. This read-out interval Tr is defined by tb and tc as shown in FIG. 2 so that the information stored in the BBD 2 is read out at a normal pitch from tb to tc. After time tc, the program sequence returns to the beginning as shown in the flow chart of FIG. 3. Accordingly, the first pulses d1 are again applied via the switching circuit 8 to the BBD 2 so that compressed audio signals are stored in a sequence in the same manner as described hereinabove.

It will be understood that the output signal of the BBD 2 applied to the output terminal 9 is a streched-out signal since the bits or pieces of information stored in the BBD 2 are shifted slower than they were stored because of the frequency difference between the first and second pulses d1 and d2. The stretched-out signal developed at the output terminal 9 is then fed to a suitable audio frequency amplifier to drive a speaker or the like. A suitable smoothing circuit may be employed to smooth the streched-out audio signal and thus the intelligibility may be increased.

The microcomputer 7 keeps feeding the first pulses d1 if the level detecting circuit 3 does not produce a high level output signal b which indicates that the reproduced audio signal has a relatively high level. In this case, the BBD 2 merely delivers a delayed audio signal of fast pitch. Namely, the listener will get an unintelligible "Donald Duck" sound. Although some skilled persons, such as tape editors, are able to distinguish whether an audio signal reproduced at a high speed is either a speech or a piece of music, such a fast speaking with high frequency may bother ordinary persons. In order to avoid such a "Donald Duck" effect a suitable gate circuit may be added to the output terminal 9.

Figure 5:
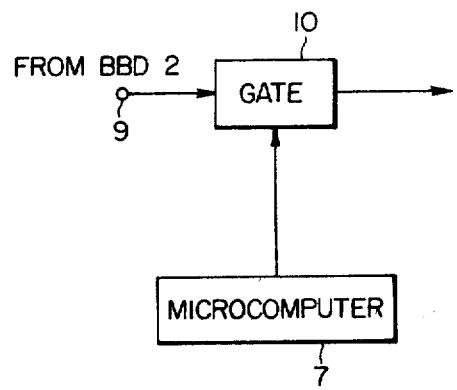
FIG. 5 is a block diagram of circuitry which may be added to the apparatus shown in FIG. 1.

Hence, reference is now made to FIG. 5 which shows a block diagram of circuitry for preventing reproduced audio signals having relatively low level from being monitored. The circuitry comprises a single gate circuit 10 for transmitting the output signal of the BBD 2 of FIG. 1 only when a gate control signal is applied from the microcomputer 7. The microcomputer 7 is so arranged to produce the gate control signal only when the switching circuit 8 passes the second pulses d2. Consequently, only the audio signals having normal pitch are monitored.

Figure 4:
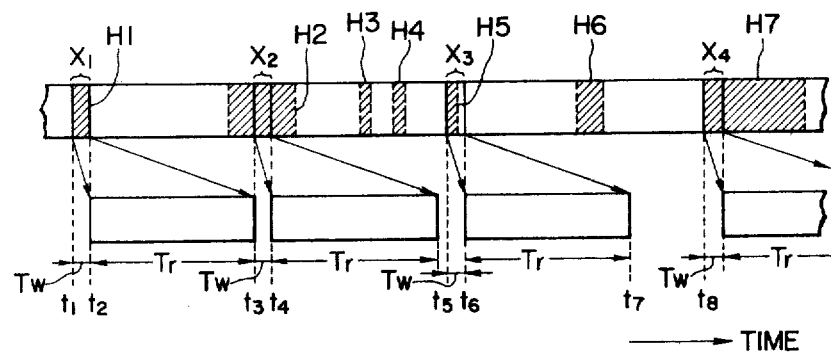
FIG. 4 shows a schematic view of a magnetic tape and the relationship between audio signals on the tape and stretched-out information.

FIG. 4 shows a schematic view of a magnetic recording tape and the relationship between audio signals on the tape and expanded information. Suppose that an audio signal has been recorded on the magnetic tape, and portions H1 to H7 having amplitude greater than the before mentioned threshold are shown to be hatched. In other words, the signal level at the non-hatched portions is below the threshold. It is assumed that the first hatched portion H1 has its length on fast playback which is equal to the before mentioned write-in delay time Tw. The audio signal reproduced at a high speed from a portion X1 of the first hatched portion H1 is stored in the BBD 2 for the period Tw defined by t1 and t2 which respectively correspond to ta and tb in FIG. 2. The compressed audio signal from the portion X1 is stretched out into a length corresponding to the read-out interval Tr defined by t2 and t3 (t3 corresponds to tc in FIG. 2) so that this stretched-out audio signal is monitored for this read-out interval Tr. Although the second hatched portion H2 starts being scanned by the reproduce head prior to time t3, the top portion of the second hatched portion H2 is not monitored since the apparatus is still stretching out the first hatched portion H1. At time t3, the expansion of the first hatched portion H1 is completed so that an audio signal from a second portion X2 in the second hatched portion H2 is stored in the BBD 2 for an interval Tw defined by t3 and t4. This stored information will be stretched out in the same manner as described in the above. The fifth hatched portion H5, however, does not have its length as much as the interval Tw. Namely, the level of the reproduced audio signal corresponding to the fifth hatched portion H5 falls below the threshold of the level detecting circuit 3 prior to the end of the interval Tw which is defined by t5 and t6. In this case, the audio signal corresponding to a portion X3 including the third hatched portion H3 is stretched out as illustrated. Accordingly, the audio signal having not only above a predetermined value but also below this predetermined value is stretched out to be monitored for the interval Tr defined by t6 and t7.

The third and fourth hatched portions H3 and H4 are in the above mentioned read-out interval Tr after time t4, while the sixth hatched portion H6 is in the above mentioned read-out interval Tr between t6 and t7, so that audio signals corresponding to these hatched portions H3, H4 and H6 are not stretched out. The top portion of the seventh hatched portion H7 is desigated as X1 and is stretched out in the same manner. The remaining portion of the seventh hatched portion H7 is dropped because it entiredly fall in the read-out interval Tr for stretching the audio signal from the portion X4.

Although in the above it has been described that the portion X3 including an audio signal having its magnitude below the predetermined value is stretched out to be monitored, only the audio signal having its magnitude greater than the predetermined value may be stretched out if desired. To this end the read-out interval Tr should be determined not only the above mentioned tape speed but also in view of the absence of the high level signal from the level detecting circuit 3. However, if the apparatus is designed in such a manner, audio signals are apt to played back at a normal speed for a short period of time so that such short period audio signals may be uncomfortable for the listener.

From the above it will be understood that in accordance with the present invention the listener is able to monitor the prerecorded information nonperiodically and intermittently at a normal playback speed or at a speed the information has been recorded. Therefore, the apparatus according to the invention is advantageous when it is intended to effect cueing since significant portions in information, such as a speech or a piece of music, are monitored with high intelligibility.

In the preferred embodiment described in the above, although the signal applied to the second input terminal 4 is derived from the recorder's drive motor, this signal may be other signal as follows: For instance, the signal to be applied to the second input terminal may be produced manually by adjusting a potentiometer watching the tape speed. Furthermore, the signal to be applied to the second input terminal 4 may be produced by detecting the rotational speed of a roller which rotates abutting on the magnetic recording tape. The BBD 2 which functions as a memory circuit may be replaced with other memory circuit, such as a random-access memory.

The A/D converter 6 provides the microcomputer 7 with data with which the microcomputer 7 calculates the above mentioned write-in delay time Tw. However, if the write-in delay time Tw does not need to be changed in accordance with the tape speed, a constant fixed interval may be used as the write-in delay time Tw. In this case the voltage-controlled oscillator 5 may be substituted with a regular clock pulse generator which produces a constant frequency pulses. If the A/D converter 6 is omitted, while the voltage-controlled oscillator 5 is replaced with a clock pulse generator, there is no need to supply the apparatus with a signal indicative of the tape speed.

It will be apparent for those skilled in the art that many modifications and variations may be made without departing from the spirit of the instant invention.

What is claimed is:

1. Apparatus for monitoring reproduced audio signals during fast playback operation, comprising:
(a) a first pulse generator for producing a first pulse train signal;
(b) a level detecting circuit responsive to a reproduced audio signal for producing an output signal when the magnitude of said reproduced audio signal exceeds a predetermined value;
(c) a memory circuit for storing pieces of said reproduced audio signal in a sequence in response to said first pulse train signal;
(d) a second pulse generator for producing a second pulse train signal the frequency of which is much lower than that of said first pulse train signal;
(e) a switching circuit for selectively supplying said memory circuit with one of said first and second pulse train signals;
(f) a control circuit responsive to said output signal of said level detecting circuit for controlling said switching circuit, said switching circuit being controlled to supply said memory circuit with said second pulse train signal upon presence of said output signal of said level detecting circuit so that said pieces of information prestored in said memory circuit are read out at a normal pitch.

2. Apparatus as claimed in claim 1, further comprises means for producing a signal indicative of the speed of a recording medium on which said audio signal was recorded, and wherein said first pulse generator comprises a variable-frequency oscillator the oscillating frequency of which varies in accordance with said signal indicative of said speed.

3. Apparatus as claimed in claim 2, wherein said variable-frequency oscillator comprises a voltage-controlled oscillator.

4. Apparatus as claimed in claim 3, wherein said voltage-controlled oscillator is responsive to a voltage applied to a drive motor which drives a take-up reel of a tape player.

5. Apparatus as claimed in claim 1, wherein said level detecting circuit comprises an envelope detector responsive to said reproduced audio signal, and a comparator responsive to an output signal of said envelope detector.

6. Apparatus as claimed in claim 1, wherein said memory circuit comprises a bucket-brigade device.

7. Apparatus as claimed in claim 1, wherein said control circuit comprises a microcomputer, and wherein said second pulse generator is a clock pulse generator built in said microcomputer.

8. Apparatus as claimed in claim 2, further comprises an A/D converter responsive to said signal indicative of said speed, said A/D converter supplying said control circuit with a digital signal indicative of said speed so that said control circuit controls said switching circuit such that said first pulse train signal is fed to said memory circuit for a period of time which is proportional to a reciprocal of said speed.

9. Apparatus as claimed in claim 8, wherein said control circuit is so constructed that it controls said switching circuit such that said second pulse train signal is fed to said memory circuit for a period of time required to read out all information stored therein.

10. Apparatus as claimed in claim 1, further comprises a gate circuit for passing the output signal of said memory circuit only when said switching circuit passes said second pulse train signal.

11. A method of monitoring reproduced audio signals during fast playback operation, comprising the steps of:
   (a) reproducing an audio signal from a recording medium at a speed higher than it was recorded;
   (b) detecting the magnitude of the reproduced audio signal;
   (c) producing a first pulse train signal;
   (d) storing said audio signal in a memory circuit in accordance with said first pulse train signal;
   (e) producing a second pulse train singal having a frequency higher than that of said first pulse train signal;
   (f) supplying said memory circuit with said second pulse train signal when the magnitude of said reproduced audio signal is detected to be above a predetermined value, for reading out the audio signal prestored in said memory circuit at a normal pitch.

12. A method as claimed in claim 11, further comprising the step of varying the frequency of said first pulse train signal in accordance with the speed of said recording medium.

13. A method as claimed in claim 11, further comprising the step of determining an interval, for which said audio signal is stored in said memory circuit, in view of the speed of said recording medium and the capacity of said memory circuit.

14. A method as claimed in claim 13, further comprising the step of determining an interval, for which said audio signal prestored in said memory circuit is read out, such that all information stored in said memory circuit can be read out by said second pulse train signal.

15. A method as claimed in claim 11, further comprising the step of passing the output signal of said memory circuit only when said second pulse train signal is applied to said memory circuit.

* * * * *